United States Patent [19]

Adlerborn et al.

[11] 4,256,688
[45] Mar. 17, 1981

[54] METHOD FOR MANUFACTURING AN OBJECT OF SILICON NITRIDE

[75] Inventors: Jan Adlerborn; Hans Larker; Jan Nilsson, all of Robertsfors, Sweden

[73] Assignee: ASEA Aktiebolag, Vesteras, Sweden

[21] Appl. No.: 70,636

[22] Filed: Aug. 28, 1979

[30] Foreign Application Priority Data

Aug. 29, 1978 [SE] Sweden ................. 7809075

[51] Int. Cl.$^3$ ............................................. C04B 33/32
[52] U.S. Cl. ................................ 264/325; 264/332
[58] Field of Search ............. 264/325, 332, 221; 65/56, 112

[56] References Cited

U.S. PATENT DOCUMENTS

| | | | |
|---|---|---|---|
| 3,318,512 | 5/1967 | Linlor | 65/112 |
| 3,455,682 | 7/1969 | Barbaras | 264/332 |
| 3,474,944 | 10/1969 | Chatelain | 65/112 |
| 3,539,919 | 11/1970 | Hogg | 65/112 |
| 3,870,498 | 3/1975 | Buurman | 65/112 |
| 4,112,143 | 9/1978 | Adlerborn | 264/332 |

*Primary Examiner*—John Parrish
*Attorney, Agent, or Firm*—Watson, Cole, Grindle & Watson

[57] ABSTRACT

Disclosed is an improved method for manufacturing an object of silicon nitride. In the method, a body preformed from silicon nitride powder and enclosed in a casing of glass is isostatically pressed with a gaseous pressure medium in a pressure vessel at a temperature required for sintering of silicon nitride. After pressing and sintering are completed, the pressure and the temperature in the pressure vessel are adjusted such that the temperature maintains the glass in a plastic state and the pressure in the pressure vessel is below the partial pressure of nitrogen gas for silicon nitride at that temperature so that the glass casing is blown up around the body and the body is freed from or can easily be freed from the glass casing.

1 Claim, 1 Drawing Figure

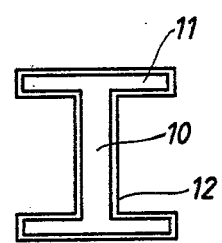

METHOD FOR MANUFACTURING AN OBJECT OF SILICON NITRIDE

BACKGROUND OF THE INVENTION

In the manufacture of objects of silicon nitride by sintering powder with isostatic pressing, the powder is suitably preformed into a manageable powder body prior to sintering and pressing. Preforming can be accomplished by subjecting the powder to a compaction, for example, by placing the powder in a sealed capsule of yielding material such as a plastic. The compaction can be conducted with advantage without the use of any binder, at a pressure of at least 100 MPa, and at room temperature or other temperature which is considerably below the temperature used during the compression in connection with the sintering. Thereafter, the preformed body can be given its desired shape by machining. Preforming can also be accomplished by, among other things, conventional techniques for the manufacture of ceramic goods. In these techniques, silicon nitride powder is typically mixed prior to preforming with a temporary binder, for example, with methyl cellulose, cellulose nitrate, an acrylate binder, a wax or a mixture of waxes. After preforming, the binder is driven off by heating so that the preformed powder body becomes essentially free from binder.

When the preformed powder body is subjected to isostatic pressing at the sintering temperature, it must, in order to give a desired dense, sintered product, be enclosed in a casing which is able to prevent the pressure medium used, normally a gas, from penetrating into the body during the pressing. The casing, which like its contents is liberated from undesirable gases during a processing step prior to sealing of the casing, must of course also have a sufficiently high strength or viscosity during pressing so as not to itself penetrate into the pores of the powder body. If a preformed capsule of glass is chosen as casing, the glass must be of a high-melting type in order not to run off or penetrate into the powder body at the high sintering temperature. However, when using glass, it is impossible to prevent the glass, when softening, from accumulating in pockets and other cavities of the preformed body. This accumulation often leads to fractures at protruding portions of the sintered article during cooling due to the differences in the coefficients of thermal expansion between silicon nitride and glass. Using a glass capsule in the method is therefore only suitable for the manufacture of objects having very simple shapes.

If it is desired to manufacture objects having very complicated shapes, the casing can be formed in situ by dipping the preformed powder body into a suspension of particles of high-melting glass or otherwise surrounding the body with a layer of particles of such glass and then heating the powder body under a vacuum at such a temperature that the particles form a dense casing about the body. This method permits the application of a casing which is thin and closely follows the shape of the powder body so that the tendency for accumulations of glass on the sintered object can be reduced, thus reducing the disadvantages connected therewith. It is also known to employ double layer of glass particles around the powder body, the innermost layer being of a high-melting glass and the outermost layer being of a low-melting glass.

After the powder body has been isostatically pressed, the glass casing must be removed from the body. Normally the removal is accomplished by blasting. However, during blasting, it may be difficult to avoid the occurrence of wounds or other damage on the surfaces of the silicon nitride body. As was mentioned above, damage caused by the existence of the glass casing may also occur during the cooling of the silicon nitride body from the sintering temperature.

SUMMARY OF THE INVENTION

Briefly, the present invention comprehends a method for manufacturing an object of silicon nitride comprising preforming a body from silicon nitride powder and isostatically pressing the preformed body enclosed in a casing of glass with a gaseous pressure medium in a pressure vessel maintained at a temperature sufficient to sinter the silicon nitride, the improvement comprising, after sintering is completed, maintaining the vessel at a temperature sufficient to cause the casing to be in a plastic state while reducing the pressure in the pressure vessel to a pressure below the partial pressure of nitrogen gas for silicon nitride at that temperature so as to thereby cause the glass casing to be blown up about the body and enable the body to be easily freed from the glass casing.

The present invention also relates to a method for manufacturing an object of silicon nitride comprising preforming a body from silicon nitride powder and isostatically pressing the preformed body enclosed in a casing of glass with a gaseous pressure medium in a pressure vessel maintained at a temperature sufficient to sinter the silicon nitride, the improvement comprising adjusting the pressure and temperature in the pressure vessel after sintering is completed such that the temperature is sufficient to maintain the glass of the casing in a plastic state and the pressure is below the partial pressure of nitrogen gas for silicon nitride at that temperature to thereby cause the glass casing to be blown up about the body and enable the body to be easily freed from the glass casing.

By using the method of the present invention, it is possible to completely remove the glass casing or considerably reduce the amount of glass remaining on the pressed body prior to cooling, thus avoiding the previously-mentioned drawbacks. According to the invention, this is achieved by blowing up the glass casing about the body while the glass is plastic by utilizing the partial pressure of nitrogen gas formed upon dissociation of silicon nitride.

The pressure utilized during sintering of the preformed silicon nitride body is dependent on whether a sintering-promoting additive such as magnesium oxide has been added to the silicon nitride. If no such additive is used, the pressure should be at least about 100 MPa, preferably to about 200–300 MPa. When using a sintering-promoting additive, a lower pressure can be used, preferably, however, at least about 20 MPa. Sintering of the preformed body is carried out at at least about 1600° C., preferably about 1600–1900° C.

Nitrogen gas or inert gases such as argon and helium are preferred as the pressure medium for the isostatic pressing.

The casing of glass may consist of a preformed capsule of glass or may be formed in situ by providing one or more layers of glass particles on the body and then heating to cause the layers to form a tight casing around the body.

The partial pressure of the nitrogen gas above silicon nitride due to dissociation amounts to about 0.1 MPa at about 1900° C., to about 0.01 MPa at about 1730° C., and to about 0.001 MPa at about 1550° C. According to the present invention, when the sintering of the silicon nitride body has been completed, the pressure in the pressure vessel is reduced to a value below any of the above exemplified values if the silicon nitride body has been caused to assume any of the exemplified temperatures so as thereby to facilitate removal of the casing. Clearly, the temperature must be maintained at a value such that the casing is still plastic so that the casing can be blown up.

The invention will be explained in greater detail by way of example with reference to the accompanying drawing.

DESCRIPTION OF THE DRAWING

In the drawing, the sole FIGURE shows a preformed body of silicon nitride surronded by a porous layer of a high-melting glass which, prior to the isostatic pressing, is transferred into a casing impenetrable to the pressure medium used.

DETAILED DESCRIPTION OF THE PREFERRED EMBODIMENTS

Silicon nitride powder having a powder grain size of less than about 7 microns and containing about 0.5 percent by weight of free silicon and about 0.1 percent by weight of magnesium oxide is placed in a capsule of rubber or plastic, for example, softened polyvinyl chloride, having approximately the same shape as the preformed powder body to be manufactured. The capsule is then sealed and placed in a press device, for example the device shown in FIGS. 1 and 2 in U.S. application Ser. No. 627,688, the disclosure of which is hereby incorporated by reference. The powder is subjected to a compaction at about 600 MPa for a period of about 5 minutes. After compaction is completed, the capsule is removed and the preformed powder body thus manufactured is machined into the desired shape.

The preformed body, which is designated 10 in the FIGURE, is of a cylindrical shape and has disc-formed flanges 11. Body 10 is coated with porous layer 12 by immersing the body in a water suspension of glass powder consisting of about 96.7 percent by weight $SiO_2$, about 2.9 percent by weight $B_2O_3$ and about 0.4 percent by weight $AL_2O_3$ and then drying.

The preformed powder body 10 with applied glass casing 12 is thereafter placed in a high-pressure furnace which is provided with a conduit through which gas can be discharged for degassing of the powder body and gas can be supplied for generating the required pressure for the isostatic pressing. The furnace also includes heating means capable of producing the temperatures required for sintering. Such a high-pressure furnace is described, for example, in the previously mentioned U.S. application Ser. No. 627,688 and is shown in FIG. 4 thereof.

Preformed powder body 10 with the applied porous layer 12 is first degassed in the high-pressure furnace for approximately 2 hours at room temperature. Thereafter, the furnace is filled with nitrogen gas of atmospheric pressure and the temperature of the furnace is increased to about 1200° C. While maintaining the pressure which may take approximately 2 hours. Thereafter, the temperature is increased successively during the course of about 3 hours from about 1200° C. to about 1650° C. while nitrogen gas is simultaneously successively introduced to yield a pressure of about 0.7 MPa, the pressure outside layer 12 of preformed body 10 being at all times maintained at at least the pressure which prevails in the remaining gas in the pores of the preformed body. When the temperature has reached about 1650° C., a casing, impermeable to the nitrogen gas, has been formed from layer 12. Thereafter additional nitrogen gas, or perhaps argon or helium, is supplied to the furnace to yield a pressure of about 250 MPa in the pressure medium at the final sintering temperature. The temperature is then increased to about 1750° C., and the silicon nitride is sintered at this temperature and the pressure stated for about 0.5–6 hours.

The pressure is then reduced to about 0.001 MPa and the temperature is reduced to about 1600° C., i.e., so that at this temperature, the pressure in the pressure vessel will be lower than the partial pressure of the nitrogen inside the glass casing which surrounds the silicon nitride body. The glass casing will then be blown up from the body due to the nitrogen gas pressure within the casing and the body thereby becomes free or approximately free from glass. Any glass from the casing still remaining on the body after the casing has been blown up can be later removed by blasting.

While the present invention has been described with reference to particular embodiments thereof, it will be understood that numerous modifications may be made by those skilled in the art without actually departing from the spirit and scope of the invention as defined in the appended claims.

We claim:

1. In a method for manufacturing an object of sintered silicon nitride which comprises preforming a body from silicon nitride powder, enclosing the body in a glass casing, and subjecting the enclosed body to isostatic pressing with a gaseous pressure medium in a pressure vessel maintained at a temperature sufficient to sinter the silicon nitride, the improvement comprising freeing the glass casing from the sintered object after the pressing and sintering operations have been completed by adjusting the condition of pressure and temperature in the pressure vessel such that the temperature is at a level sufficient to maintain the glass of the casing in a plastic state and the pressure surrounding the glass casing is at a level below the partial pressure of nitrogen gas above silicon nitride due to dissociation of the latter at said temperature level.

* * * * *